Dec. 11, 1956     H. I. MANDOLF     2,773,655
FISHING REEL
Filed Oct. 31, 1952     3 Sheets-Sheet 2
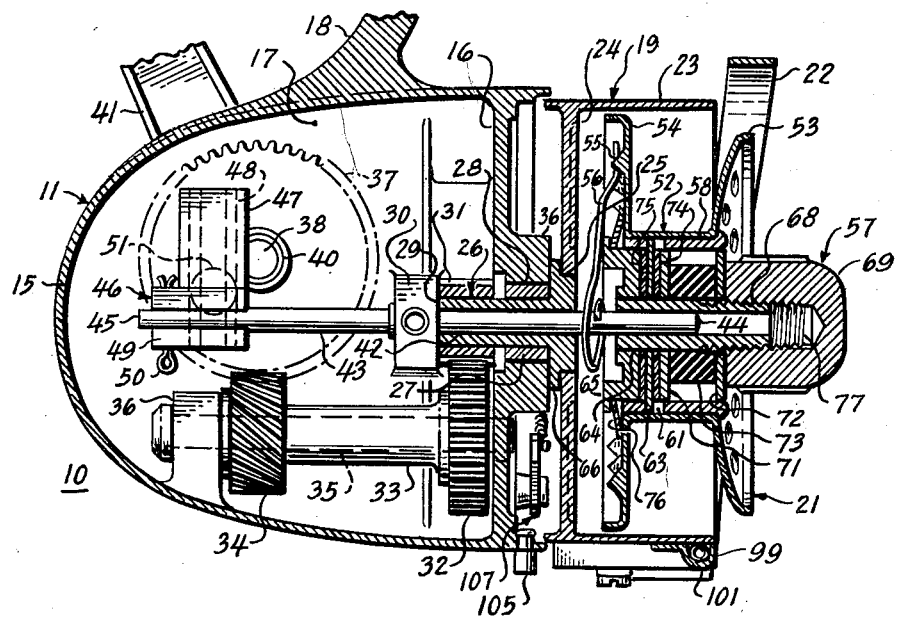
INVENTOR:
Henry I. Mandolf
BY
Walter J. Jason
ATTORNEY Dec. 11, 1956 — H. I. MANDOLF — 2,773,655
FISHING REEL
Filed Oct. 31, 1952
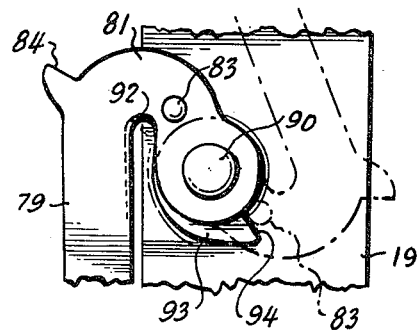
FIG. 9
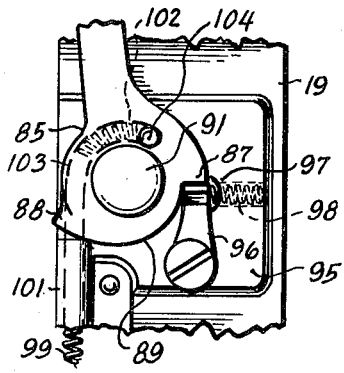
FIG. 10
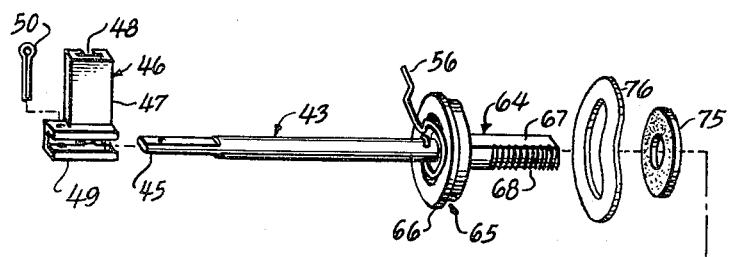
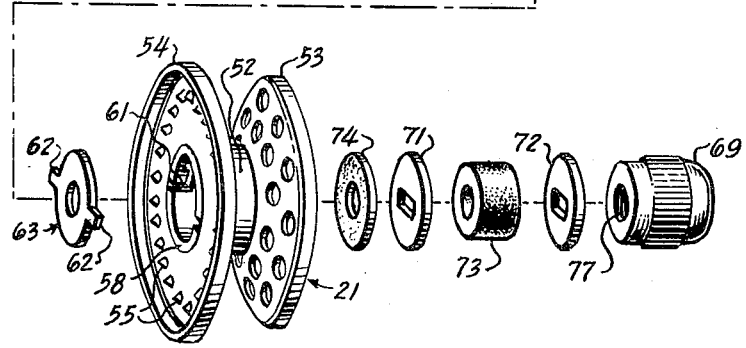
FIG. 11
INVENTOR:
Henry I. Mandolf
BY Walter J. Jason
ATTORNEY

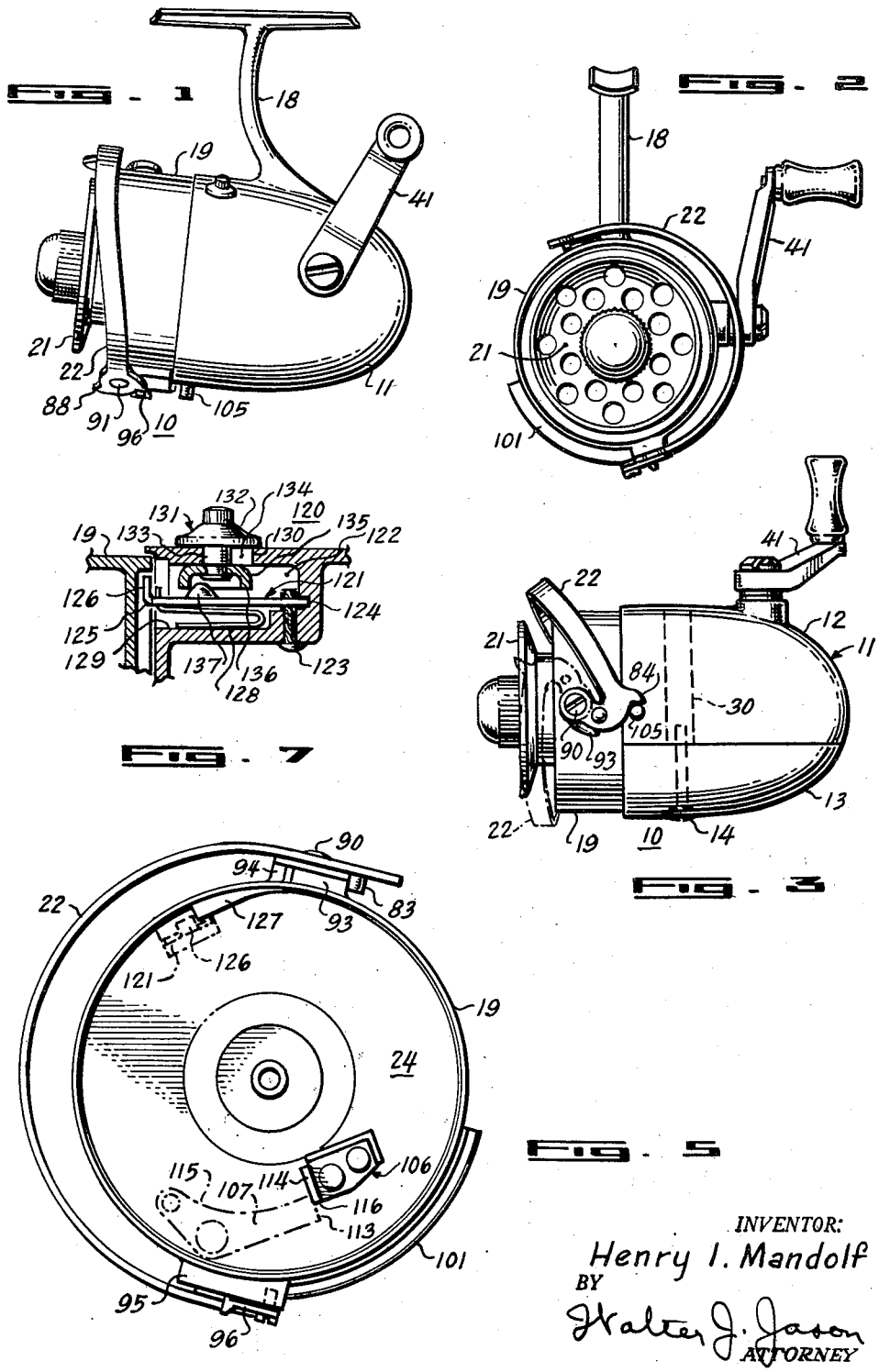

United States Patent Office 2,773,655
Patented Dec. 11, 1956

2,773,655

FISHING REEL

Henry I. Mandolf, San Diego, Calif., assignor to Langley Corporation, San Diego, Calif., a corporation of California Application October 31, 1952, Serial No. 317,981

2 Claims. (Cl. 242—84.4)

The present invention relates to fishing reels and more particularly to improvements in fishing reels of the spinning reel type wherein the line spool is afforded a reciprocal motion and is arranged for cooperation with a rotary cowl which carries a line guide. This type of reel is further characterized by the feature that the line spool remains stationary during casting.

An object of the present invention is to provide a spinning reel of improved construction wherein the operative parts thereof are readily placed in best position for casting.

Another object of the invention is to provide an improved form of spinning reel in which the line guide is halted at the time of casting always in the optimum position for permitting ready and easy grasping of the line.

Another object of the invention is the provision of a spinning reel having a unique construction which will not permit reverse rotation of its handle and thus prevents undesirable rapid unreeling of the line.

Another object of this invention resides in providing in a spinning reel a new and improved form of line guide which will automatically return from its casting position to its line wind-in position on rotation of the handle.

Still another object of this invention is the provision of novel stop devices for a spinning reel which in cooperation locate the cowl and its associated line guide in a given position.

A still further object of the invention resides in the provision of a spinning reel of the character set forth which is simple and sparing in its parts and which is particularly efficient and effective in its operation.

Other objects and features of this invention will be readily apparent to those skilled in the art from the following specification and appended drawings illustrating certain preferred embodiments of the invention in which:

Figure 1 is a side elevational view of a spinning reel embodying the present invention.

Figure 2 is an end elevation of the reel.

Figure 3 is a bottom view of the reel.

Figure 4 is a transverse sectional view.

Figure 5 is a view of the rear face of the cowl unit of the reel.

Figure 6 is an end view of the gear housing, the cowl unit being removed from the reel to afford this end view.

Figure 7 is a view of a detail.

Figure 8 is a perspective view of the line guide.

Figures 9 and 10 are fragmentary views showing details of the mountings for the line guide of Figure 8; and Figure 11 is an exploded view of the mounting and brake for the spool.

Particular reference will now be had to the drawings wherein the spinning reel as an assembly is indicated by the numeral 10. Spinning reel 10 comprises a housing 11 formed of a body portion 12 and a cover section 13. A screw 14 removably maintains cover section 13 on body portion 12. With its body portion 12 and cover section 13 in assembly housing 11 is shown to be of generally conoidal shape. The conical walls 15 of housing 11 in cooperation with its circular end wall or base 16 define a gear chamber 17. A usual mounting arm 18 extends outwardly from housing 11 by means of which reel 10 may be secured, in conventional manner, to a fishing rod.

Positioned forwardly of end wall 16 of housing 11 is a rotatable cowl or casing 19 which contains a portion of a spool 21 and within which spool 21 is adapted to move reciprocally. A line guide or bail 22 is pivotally carried upon cowl 19 and is bodily movable therewith.

Cowl 19 is generally cup-shape in form having annular walls 23 and a circular base 24. Suitably rigidly affixed to base 24, at a central opening therein, is flange 25 of a drive shaft 26. Drive shaft 26 is rotatably positioned, adjacent its flange 25, within a bearing 27 secured within an opening 28 provided in end wall 16 of housing 11 and projects into gear chamber 17. The inner end 29 of drive shaft 26 is of reduced diameter and is rotatably positioned within an opening in a boss 30 provided by body portion 12. The upper end of boss 30 is tapped to receive screw 14 which holds cover section 13 to body portion 12. Suitably affixed, as by a press fit, upon drive shaft 26 adjacent boss 30 is a gear 31 which is in mesh with a gear 32. Gear 32 is secured to one end of a hollow shaft 33 which mounts a spiral gear 34 at its opposite end. Shaft 33 and its two gears 32 and 34 are rotatably supported on a rod 35 which is affixed between a boss 36 of housing 11 and the end wall 16 thereof. Spiral gear 34, as shown, meshes with a spiral gear 37 carried by a shaft 38. Shaft 38 is rotatable within a bearing 40 suitably supported by wall 15 of housing 11 and is so arranged that its axis is transverse to the axis of rod 35 which mounts gears 32 and 34. A crank 41 is affixed to the exterior end of shaft 38 and serves on manual rotation to affect rotation of shaft 38 to turn spiral gear 37 and therethrough gears 32 and 34. Gear 32 in mesh with gear 31 actuates it to rotate drive shaft 26 and cowl 19 affixed thereto.

Drive shaft 26 is provided with a through bore 42 which accommodates a shaft 43, shaft 43 being of sufficient length to extend from within cowl 19 into chamber 17 and across the face of spiral gear 37. Spool 21 is secured, in a manner to be described, to the exterior end 44 of the shaft 43 which lies within cowl 19. Positioned on the opposite or interior end 45 of shaft 43 is a generally L-shaped drive block 46 having its longer leg 47 provided with a T-shaped slot 48 and its shorter leg 49 held to end 45 by a cotter pin 50. A button element 51 is mounted on the face of spiral gear 37 in position to have its disk-shaped head slidably receivable within T-shaped slot 48. Rotation of spiral gear 37 by crank 41 revolves button 51 about shaft 38 as a center. This revolving movement causes button 51 to move to-and-fro relative to drive block 46 within its T-shaped slot 48. The described revolving and to-and-fro movements of button 51 impart a longitudinal reciprocal motion to the shaft 43. Thus rotation of crank 41 simultaneously effects rotational movement of cowl 19 and a rectilinear or reciprocal linear motion of spool 21. Crank 41, of course, may be located on either side of housing 11 dependent on whether it is to be operated by the right or the left hand.

Spool 21 comprises a cylindrical portion 52 having an outwardly facing perforated dished flange 53 at one end and a generally cup-shaped flange 54 at its opposite end. Cup-shaped flange 54 is provided with an annular series of cone-shaped projections 55 which are progressively engageable with the free end of a resilient wire element 56 suitably affixed at its opposite end to shaft 43. As spool 21 rotates on shaft 43, subject to the influence of a frictional assembly 57 to be described, the various cone-shaped projections 55 are brought into and out of contact with the free end of wire element 56 to generate a clicking sound which signals the rotation of spool 21.

Cylindrical portion 52 of spool 21 is interiorly fitted with a bushing 58, suitably rigidly affixed in place. Bushing 58 is provided with a pair of diametrically opposed bayonet slots 61 extending inwardly from its interior annular edge, the slots being adapted to receive peripheral projections 62 of a metallic disk 63 which forms an element of the frictional assembly 57.

Spool 21 is supported upon shaft 43 for reciprocal movement therewith. It is also adapted to move rotatively relative to shaft 43 but this latter movement is frictionally restrained. The mounting arrangement for spool 21 includes a sleeve 64 machine pressed upon the end 44 of shaft 43. In turn there is fitted on sleeve 64 an annular member 65 having a peripheral flange 66. In external appearance sleeve 64 is substantially rectangular with opposed flat faces 67 and is externally threaded as at 68. Associated with and carried by sleeve 64 is the frictional assembly 57 which, as best shown in Figure 11, is constituted of a tensioning knob 69, a pair of metallic disks 71 and 72 having substantially rectangular openings permitting the disks to be non-rotatably fitted upon sleeve 64, a cylindrical body 73 of rubber interposed between disks 71 and 72, a friction washer 74 formed of pressed fiber or the like, and the metallic disk 63 which cooperates with the bayonet slots 61 of bushing 58. Additionally to the elements named and positionable on sleeve 64 on the interior side of disk 63 are a second friction fiber washer 75 and a spring washer 76, with friction washer 75 adapted to abut the face of disk 63 and spring washer 76 being carriable by the annular member 65 to lie adjacent peripheral flange 66 thereof. As shown in Figure 11 spring washer 76, which may be formed of spring steel or any other suitable resilient metal, has a distorted shape, as shown, so that on the movement of spool 21 thereagainst to flex it somewhat it reacts with a resilient force which serves to releasably maintain projections 62 of disc 63 within bayonet slots 61 of bushing 58 carried by spool 21 to releasably affix spool 21 upon sleeve 64 and spaced slightly from flange 66 of member 65.

Figure 4 illustrates the spool 21 and its associated frictional assembly 57 operatively positioned on sleeve 64 upon the end of rectilinearly movable shaft 43. In this position spring washer 76 lies between opposed flat surfaces provided by cup-shaped flange 54 of spool 21 and flange 66 of annular member 65 and, as stated, constantly exerts a force outwardly against spool 21 to tend to urge spool 21 away from annular member 65 and to hold projections 62 in bayonet slots 61. Metallic disk 63 is affixed to bushing 58 of spool 21 by projections 62 thereof fitting within bayonet slots 61 of bushing 58. Friction washers 74 and 75 are positioned within bushing 58 on either side of metallic disk 63 and the metallic disks 71 and 72 with the interposed cylindrical rubber body 73 are mounted on sleeve 64 outwardly of metallic disk 63 and are urged toward metallic disk 63 by tension adjusting knob 69. Tension adjusting knob 69, as shown, has a threaded axial opening 77 whereby knob 69 may be rotatively mounted upon threaded portion 68 of sleeve 64 and its inner end may be brought to bear against metallic disk 72. The pressure exerted by knob 69 is transmitted through metallic disk 72, rubber body 73, metallic disk 71 and friction washer 74 to the face of fixed metallic disk 63. The pressure applied by knob 69 against metallic disk 63 serves to restrain spool 21 against ready or free rotational movement relative to shaft 43 and sleeve 64. By adjusting knob 69 more or less pressure may be applied to disk 63 and more or less drag is thereby exerted against rotation of spool 21. Thus, by reason of the frictional mounting of spool 21 on reciprocating shaft 43 spool 21 will normally reciprocate with shaft 43 when a line is being wound upon or cast off of the spool. Removal of spool 21 from sleeve 64 without disturbing frictional assembly 57 is readily accomplished by pressing it inwardly against distorted washer 76, then rotating it relative to sleeve 64 to free projections 62 from engagement in bayonet slots 61 and then pulling it outwardly. With the present construction spools having different types of fishing lines may be readily interchanged.

Line guide or bail 22 which directs a line upon spool 21 during the reciprocal movement of the latter is, as stated hereinabove, pivotally mounted upon rotatable cowl 19. This line guide 22, as best shown in Figure 8, includes a body portion 79, generally semi-circular in shape, having at one end 80 a reversely directed extension 81 which has an opening 82 therethrough and carries a downwardly directed pin 83 located rearwardly of opening 82. Also provided at end 80 of body portion 79 is an ear or stop portion 84 projecting outwardly generally oppositely to extension 81. The opposite end of line guide 22 is enlarged as shown at 85 and has an opening 86 therein. A pair of oppositely directed ears or stops 87 and 88 extend from opposite lateral edges of enlarged portion 85, and are joined by a rounded camming surface 89. A pair of diametrically opposed pins 90 and 91 mounted on cowl 19 fitted respectively within openings 82 and 86 of line guide 22 provide the desired pivotal connection for the line guide to permit swinging movement thereof upon cowl 19.

It is noted that the formation of reversely directed extension 81 on line guide 22 results in a generally half-round surface being effected as at 92. The line, not shown, which is to be wound upon spool 21 will be confined within the space between extension 81 and body portion 79 to rest upon half-round surface 92 and be guided thereby upon spool 21 when crank 41 is manipulated. Operation of crank 41, in a counterclockwise or forward direction in the illustration of Figure 1, will, as described above, result in a rotative movement of cowl 19 to rotate line guide 22 bodily about the longitudinal axis of the fishing reel. This movement of line guide 22 will cause the latter by reason of engagement of the line by half-round surface 92 to lead, or guide, the line extending from the rod through a right angle turn onto spool 21. Spool 21, as has been explained hereinbefore, will, during the rotative movement of cowl 19 and line guide 22 be actuated to-and-fro in a predetermined relation to line guide 22. It is noted, however, that spool 21 does not itself rotate. Now with spool 21 being afforded a rectilinear movement and line guide 22 rotating the line which passes over the latter element will be wound onto spool 21. The disposition of the line on spool 21 will approximate a helix.

Formed upon the peripheral surface of cowl 19 at the side thereof to which end 80 is pivotally connected is a generally circular raised portion 93 from which extends an ear or stop 94 adapted to be engaged by pin 83 carried by extension 81 of line guide 22. Pin 90 projects through raised portion 93 to extend into opening 82 of line guide 22. Also formed upon the peripheral surface of cowl 19, diametrically opposite to raised portion 93, is a generally rectangular raised portion 95 through which pin 91 projects for insertion into opening 86 of line guide 22. As best shown in Figure 10, a pawl 96 is pivotally mounted on rectangular raised portion 95 for cooperation with the oppositely directed ears 87 and 88 extending from enlarged portion 85 of line guide 22. Positioned within a recess 97 formed within raised portion 95 is a spring 98 which acts against a downwardly projecting portion (not shown) of pawl 96 to bias the latter continuously in a counterclockwise direction toward enlarged portion 85 of line guide 22. In the line winding position of line guide 22 ear 87 thereof will engage pawl 96, as shown in Figure 10. Line guide 22 is normally resiliently maintained in this position by a spring 99 which fits for a greater portion of its length within an arcuate housing member 101 suitably affixed upon cowl 19. Spring 99 projects from housing 101 and extends one end 102 within an arcuate recess 103 in rectangular raised portion 95 to lie adjacent a pin 104 carried at enlarged portion 85 of line guide 22. Movement of line guide 22 from its line winding position toward its casting position causes pin 104 to move against the end 102 of spring 99 to compress it within its housing 101. In this movement ear 87 moves away from pawl 96 which is engaged by camming surface 89. Ear 88 obviously moves toward pawl 96. When line guide 22 has been moved into its casting position, pawl 96 will slip from rounded camming surface 89 into engagement with ear 88. This engagement of ear 88 and pawl 96 releasably restrains line guide 22 to prevent it from returning to its normal position under the bias of compressed spring 99. It is to be noted however that ear 88 is so shaped that it can be cammed from engagement with pawl 96 on the proper application of pressure to bail 22, as will be later described in detail.

The position, relative to cowl 19, of end 80 of line guide 22 in the line winding position of line guide 22 is shown in Figure 9 by the full line representation. The dash-dot outline shows end 80 in the casting position of line guide 22. In this latter position pin 83 carried by extension 81 of end 80 engages stop 94 of raised portion 93. It is here noted that pin 83 moves into engagement with stop 94 immediately after ear 88, at the opposite end of line guide 22, moves into position to be engaged by pawl 96. Thus ear 88 and pawl 96 normally prevent line guide 22 from returning to its normal line winding position while pin 83 and stop 94 determine the casting position of line guide 22.

Means are provided for automatically returning the line guide 22 from its casting position to its line winding position. This means consists of the ear 84 on end 80 of line guide 22 and an upwardly projecting pin 105 provided on housing 11 adjacent its forward edge. When line guide 22 is in its casting position ear 84 will have been moved from a position pointing away from the front of the fishing reel, as in Figure 9, to a position where it points toward the rear of the fishing reel, as shown in Figure 3 and in dot-dash outline in Figure 9. In such position ear 84 extends beyond the forward rim of housing 11 and is adapted to engage with projecting pin 105 which lies in its path of movement. Engagement of ear 84 and projecting pin 105 occurs when crank 41 is rotated in its line winding direction. In this movement, crank 41, through the various gears 37, 32, 34 and 31, effects rotation of drive shaft 26 and cowl 19 carried thereon. Since line guide 22 is mounted on cowl 19 it will move with it to press ear 84 against projecting pin 105. Figure 3 shows ear 84 just as it has engaged pin 105. Continued rotative pressure on crank 41 will cause pin 105 to bear with greater pressure against ear 84. This pressure is transmitted to opposite end 85 of line guide 22 and will cause pawl 96 to be pushed rearwardly by the camming action of ear 88 to separate ear 88 from pawl 96. With ear 88 disengaged from pawl 96 the force of compressed spring 99 comes into play acting on pin 104 of line guide 22 to rotate the latter from its casting position of Figure 3 across the face of spool 21 and into its normal or winding position.

Means are afforded in the present fishing reel for halting line guide 22 always in the same identical location on reverse rotation of crank 41 when it is desired to cast a line. Casting a line from a spinning reel necessitates certain preliminary operations. The line guide 22 must be moved from its normal or winding position where its body portion 79 obstructs the line. With line guide 22 moved from its wind position to its cast position as in Figure 3, where it is held by the engagement of ear 88 with pawl 96 the body portion 79 cannot contact the line which extends from the rod to the spool 21. Now when a cast is made, with a whip of the hand, the line, which, as is customary, carries a weight or bait at its free end, will spool off and travel through the usual guides on the fishing rod into space. When line guide 22 is moved from its wind-in position to its cast position care should be taken that the line does not begin to spool off before the fisherman is ready to cast. Inadvertent spooling off is caused by the weight provided at the end of the fishing line, such weight starts to fall to bring about a movement of the line the moment that line guide 22 is moved free of the line. It is apparent that moving line guide 22 removes the resistance applied to the line which normally prevents such weight from pulling the line from spool 21. To prevent this inadvertent unwinding of the line the line guide 22 must first be manipulated by the crank to a location where it will present the fishing line in substantially the nearest position to the forefinger and thumb of the fisherman's right hand, which customarily holds the rod and reel. The forefinger is then curled around the line to hold it. It is obvious that after the line has been picked up by the forefinger rotative movement of line guide 22 from its wind position to its cast position will not result in the weight spooling the line from spool 21.

From experience it has been determined that the correct position of the line for grasping by the forefinger should be approximately between 11 and 12 o'clock with reference to the face of the fishing reel. In the usual spinning reels now in use movement of the line to the desired position is a matter of trial and error. Various of the prior art spinning reels have manually adjustable crank anti-rotation means which may be appropriately operated to assist in the positioning of the line. However, unless such anti-rotation means are properly adjusted the line can overshoot the desired position and it very often is necessary to actuate the crank two or three times to move the cowl housing with its line guide into the required position because if the desired line position is overshot, it is necessary, in the usual spinning reel, to rotate the crank a full turn in order to approach and occupy the desired line position again. Further, after the cast is made and a fish should bite, if the fisherman had failed to re-adjust the anti-rotation means to prevent reverse rotation the pull of the fish on the line would effect undesired reverse rotation of the handle. Grasping a reversely rotating handle is obviously difficult and injury to the fisherman's knuckles might occur. Unless the fisherman is fortunate in quickly obtaining a hold upon the crank the fish might succeed in unreeling the reserve length of line on the spool which is necessary for tiring of the fish.

In the case of spinning reels having no anti-rotation device it has been found that in addition to being difficult to readily locate the line in the desired position for picking off preparatory to casting, the fisherman must always contend with a reversely rotating handle each time he achieves a strike.

The present invention embodies means for readily and unvaryingly positioning the line guide 22 in the required optimum position for picking up by the forefinger preparatory to casting off. The same means also serves to prevent reverse rotation of the handle when a strike is made. The means for accomplishing these desired ends, as best shown in Figures 5 and 6, consist of a generally L-shaped stop member 106 mounted, as by rivets, upon the rear face of base 24 of cowl 19 and a generally L-shaped level element or pawl 107 pivotally supported between its ends upon a pin 108 carried by end wall 16 of housing 11. A spring 109 is secured to one end 111 of pawl 107 and extends to and is secured to a pin 112 on end wall 16. Pawl 107 is adapted to be biased by spring 109 to place its free end 113 in position to engage upstanding leg 114 of stop 106 when cowl 19 is rotated in reverse direction. However on rotative movement of cowl 19 in line winding direction there will be no interference offered by pawl 107 to stop 106. It is noted that the lateral edge 115 of pawl 107 nearest the axis of the reel is arcuate. When cowl 19 is rotated in line winding direction lateral edge 116 of stop upright leg 114 engages and rides along arcuate edge 115 of pawl 107. As this edge 116 passes from end 111 of pawl 107 to end 113 thereof it causes pivotal movement of pawl 107 about its pin 108 to swing end 113 outwardly. As edge 116 rides free of end 113 spring 109 will return pawl 107 to its normal position. It is obvious that with pawl 107 in its normal position cowl 19 cannot be rotated in reverse direction for end 113 of pawl 107 will lie in the path of upright leg 114 of stop 106 to oppose return movement of cowl 19. Thus by reason of the cooperation of stop 106 and spring-restrained pivoted pawl 107 cowl 19 can be rotated a full 360° by crank 41 only in one direction, clock-wise as viewed in Figure 2. Movement in the reverse direction is obviously only in the amount required to move stop 106 against free end 113 of pawl 107. Since cowl 19 cannot reversely rotate, handle 41, operatively connected to its likewise cannot rotate in reverse direction, and a fisherman can quickly grasp a stationary handle to begin the maneuver of playing the fish without undue loss of line from the spool.

Though stop 106 and pawl 107, as described, serve to limit cowl 19 to free rotative movement in but one direction, they are effective to accomplish a second desired end, that of halting cowl 19, on reverse movement of crank 41, always at the same spot. This for the purpose of automatically positioning the fishing line at the location where it may be readily picked up by the forefinger preparatory to a cast. Stop 106 carried upon the rear face of cowl 19 and pawl 107 carried by end wall 16 of housing 11 are so located relative to line guide 22 that when stop 106 and pawl 107 are brought into engagement, on reverse movement of crank 41, line guide 22 will always be halted in the position shown in Figure 2. In this predetermined stopping position of line guide 22 half-round surface 92 of line guide 22 over which the fishing line passes and which serves to guide the fishing line in its movement from the fishing rod to the spool 21 will be located at between 11 and 12 o'clock with reference to the face of the fishing reel. With line guide 22 in the described position the fishing line passing thereover can be easily grasped by the fisherman's forefinger.

It is here noted that for the purposes of the present invention it is not required that stop 106 be positioned on cowl 19 only and pawl 107 only on housing 11. It is obvious that their positions could be reversed, placing stop 106 on housing 11 and pawl 107 on cowl 19 will effect the same automatic positioning of the fishing line and restriction on reverse rotation of the crank 41 as in the first arrangement. Choice of arrangements will be determined by the condition of balance of the rotatable cowl 19, the weight of one may be more effective than the other in subduing any tendency of the cowl 19 to vibrate during rapid rotation.

The fishing reel of the present invention also includes means which obviate a disadvantage of usual spinning reels, which disadvantage is that of the line loosening on the spool when it is desired to interrupt fishing and lay the rod aside or to store the rod. Since cowl 19 is a rotative part and may, either through the gravity force on line guide 22 carried by cowl 19 or other forces acting thereon, rotate in a direction opposite to the direction of winding-in, loosening of the line is possible. In the usual spinning reel it is customary to place Scotch or adhesive tape, or a metal clip on the fishing line on the spool in an attempt to prevent unwinding of the line should the cowl inadvertently rotate. These make-shift means have not been found to be too satisfactory.

As has been described, means, in the form of the stop 106 and pawl 107, have been afforded for halting the cowl 19 in a position which locates the fishing line between 11 and 12 o'clock. To prevent inadvertent movement of cowl 19 in the reverse direction from this predetermined position a locking assembly best shown in Figure 7 and indicated generally by the numeral 120 is used. Locking assembly 120 embodies a generally L-shaped element 121 positioned within a chamber 122 formed in housing 11 and opening to the exterior at the rear of cowl 19; as shown element 121 is held within chamber 122 by a pin 123 which secures end 124 thereof to a wall surface of the chamber. Free end 125 of element 121 carries an upwardly projecting detent portion 126, and projects out of chamber 122 to within the confines of the annular walls of cowl 19. This detent portion 126 is adapted to engage a stop 127 formed on the inner wall surface of cowl 19 to prevent rotative movement of cowl 19 in a clockwise direction, as will be hereinafter more fully discussed. A spring element 128 formed of suitably bent wire is also located within chamber 122 between the L-shaped element 121 and a surface 129. This spring element 128 has one end pressing upon the under surface of element 121 and exerts force thereon to bias element 121 from surface 129 to position free end 125 and detent portion 126 in the path of movement of stop 127 of cowl 19. To move free end 125 out of the path of stop 127 there is provided an actuating device 131 comprising a button 132 located exteriorly of housing 11 having a shank portion 133 which projects through a slot 134 in housing 11 into chamber 122 and has a generally dish-shaped member 135 secured to its end. Since the outlines of button 132 and dish-shaped member 135 are larger than slot 134 it is evident that mounting of the latter on shank 133 holds the button 132 slidably on housing 11. Manual movement of button 132, of course, results in movement of dish-shaped element 135. Dish-shaped member 135 embodies an annular flange 136 which extends toward L-shaped element 121 and is adapted to be moved into and out of engagement with a tit 137 carried on the upper surface of L-shaped element 121. When flange 136 is moved onto tit 137 generally L-shaped element 121 will be forced downwardly against the force of spring 128 to move detent portion 126 out of the path of movement of stop 127 on cowl 19 to allow free rotation thereof by crank 41. Actuation of button 132 to disengage flange 136 from tit 137 allows spring 128 to exert its bias to again present detent portion 126 in position to be engaged by stop 127.

The present fishing reel thus embodies structure for effectively maintaining the cowl 19 and its associated line guide 22 in a given position. Rotative movement of cowl 19 in a counterclockwise direction from this given position is at no time possible because of stop 106 and cooperating pawl 107. Rotative movement of cowl 19 in a clockwise, or winding, direction from this same position may be selectively controlled by locking assembly 120 whose actuating bottom 132 controls the disposition of detent portion 126 into or out of the rotative path of stop 127 on cowl 19.

Figure 2, as hereinbefore stated, illustrates line guide 22 in the position determined by stop 106 and pawl 107 which is substantially the optimum position for picking off of the line by the forefinger of the fisherman. Assuming the fisherman has grasped the line, he would then manually rotate line guide 22 to free the fishing line from confinement thereby. Line guide 22 would be pushed to the position shown in Figure 3 and would be held there by the engagement of ear 88 with pawl 96. The line wound on spool 21 may then be cast as desired. If after the cast is made, and line guide 22 has been manually flipped back to its wind-in position, cowl 19 should back off somewhat, in a clockwise direction of course, and a fish should strike, the pull of the fishing line would act on line guide 22 at surface 92 to move cowl 19 in a counterclockwise direction to force stop 106 against pawl 107. This not only prevents crank 41 from rotating in reverse but also affords sufficient resistance to set the hook in the fish which otherwise would have to be accomplished by a jerk of the fishing rod.

Assuming that a cast has been made and that line guide 22 has been permitted to rest in its cast position of Figure 3 and it is desired to reel in the line, the crank 41 would be turned to set gears 37, 32, 34 and 31 in motion to rotate drive shaft 26 and cowl 19 carried thereby and simultaneously to reciprocate shaft 43 which mounts spool 21. Rotation of cowl 19 would be, as before explained, in clockwise direction which would bring ear 84 of line guide 22 against stationary pin 105 on housing 11. This will cause ear 88 of line guide 22 to cam from pawl 96 thereby releasing line guide 22 for automatic movement by spring 99 to its guiding position. With line guide 22 in this latter position continued rotation of crank 41 will cause rotating line guide 22 to feed the fishing line over its guide surface 92 onto the reciprocating spool 21.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

What I claim is:

1. A fishing reel comprising a housing, a shaft reciprocally supported by said housing, a spool mounted on said shaft, a drive shaft journalled on said housing, a cowl carried by said drive shaft, a crank having an operative connection with both said reciprocating shaft and with said drive shaft for simultaneously reciprocating said spool and rotating said cowl, a line guide having a substantially semi-circular body portion, said body portion having a pivotal connection at each of its ends to said cowl whereby said line guide is movable relative to said cowl between a line-casting position and a position wherein it guides a fishing line for winding upon said spool on rotative movement of said cowl in a first direction, means for stopping said cowl at a predetermined location relative to said housing when said cowl is rotated in reverse direction preparatory to a line-casting operation, and simultaneously limiting the extent of reverse rotation of said crank, said last mentioned means comprising a fixed stop on said cowl and a movable pawl on said housing, spring means normally maintaining said pawl in position for engagement with said fixed member to stop said cowl only on movement of said cowl in said reverse direction, a second fixed stop on said cowl, and manually actuatable means positioned on said housing adapted to be operated when said cowl has been stopped in said predetermined position to engage said second fixed stop to lock said cowl in such position to prevent rotative movement thereof in line-winding direction.

2. A fishing reel comprising a housing, a shaft reciprocally supported by said housing, a spool mounted on said shaft, a drive shaft journalled on said housing, a cowl carried by said drive shaft, a crank having an operative connection with both said reciprocating shaft and with said drive shaft for simultaneously reciprocating said spool and rotating said cowl, a line guide having a substantially semi-circular body portion, said body portion having a pivotal connection at each of its ends to said cowl whereby said line guide is movable relative to said cowl between a line-casting position and a position wherein it guides a fishing line for winding upon said spool on rotative movement of said cowl in a first direction, movable latch means on said cowl engageable with said line guide for releasably holding the latter in its line-casting position, resilient means urging said line guide to occupy its guide position, means operative on said line guide on rotation of said cowl in line-winding direction to release said line guide from said latch means for automatic movement by said resilient means to its guide position, and means for stopping said cowl at a predetermined location relative to said housing when said cowl is rotated in reverse direction preparatory to a line-casting operation, and simultaneously limiting the extent of reverse rotation of said crank, said last mentioned means comprising a fixed stop on said cowl and a movable pawl on said housing, spring means normally maintaining said pawl in position for engagement with said fixed member to stop said cowl only on movement of said cowl in said reverse direction, a second fixed stop on said cowl, and manually actuable means positioned on said housing adapted to be operated when said cowl has been stopped in said predetermined position to engage said second fixed stop to lock said cowl in such position to prevent rotative movement thereof in line-winding direction.

References Cited in the file of this patent

UNITED STATES PATENTS

| | | |
|---|---|---|
| 2,627,383 | Tibbetts | Feb. 3, 1953 |
| 2,648,505 | Mauborgne | Aug. 11, 1953 |

FOREIGN PATENTS

| | | |
|---|---|---|
| 380,939 | Great Britain | Sept. 29, 1932 |
| 877,174 | France | Sept. 1, 1942 |
| 237,582 | Switzerland | Aug. 16, 1945 |
| 924,148 | France | Mar. 3, 1947 |
| 598,412 | Great Britain | Feb. 18, 1948 |